US008414688B1

(12) United States Patent
Delgado et al.

(10) Patent No.: US 8,414,688 B1
(45) Date of Patent: Apr. 9, 2013

(54) RECIRCULATION HIGH PURITY SYSTEM FOR PROTECTING OPTICAL MODULES OR INSPECTION SYSTEM DURING STORAGE, TRANSPORT AND SHIPPING

(75) Inventors: Gildardo Delgado, Livermore, CA (US); Frank Chilese, San Ramon, CA (US); Rudolf Brunner, Mountain View, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 12 days.

(21) Appl. No.: 13/160,878

(22) Filed: Jun. 15, 2011

(51) Int. Cl.
*B01D 46/00* (2006.01)

(52) U.S. Cl. ................ 95/90; 95/273; 96/134; 55/385.2

(58) Field of Classification Search .................... 95/118, 95/117, 133, 90, 159, 168, 170, 263, 264; 96/108, 417; 117/102; 137/240; 134/30, 134/2, 10, 11, 21, 22.1, 22.11, 26, 34, 36, 134/37, 42; 55/385.1, 385.3, 356
See application file for complete search history.

(56) References Cited

U.S. PATENT DOCUMENTS

| | | | | |
|---|---|---|---|---|
| 5,727,589 | A * | 3/1998 | Yokogi | 137/240 |
| 7,806,951 | B2 * | 10/2010 | Zimmerman | 55/356 |
| 8,057,578 | B2 * | 11/2011 | Agrawal | 95/159 |
| 8,075,704 | B2 * | 12/2011 | Spiegelman et al. | 134/30 |
| 2007/0261559 | A1 * | 11/2007 | Maroulis et al. | 96/417 |
| 2009/0205563 | A1 * | 8/2009 | Arena et al. | 117/102 |
| 2009/0249953 | A1 * | 10/2009 | Millward et al. | 95/118 |

* cited by examiner

*Primary Examiner* — Duane Smith
*Assistant Examiner* — Minh-Chau Pham
(74) *Attorney, Agent, or Firm* — Suiter Swantz pc llo

(57) ABSTRACT

A purging apparatus for a storage chamber is disclosed. The purging apparatus is configured for establishing a purge gas flow through the storage chamber. The purging apparatus may include a gas purifier and a particle filter. The gas purifier may provide a purge gas to the storage chamber. The purge gas may flow through the storage chamber, and a mixture of the purge gas and potential contaminants may subsequently exit the storage chamber as exhaust gas. The particle filter may receive and filter the exhaust gas. The filtered gas may be provided to the gas purifier for purification and recirculation. The gas purifier may purify the filtered gas by substantially removing at least one of: an acid, a base, an organic compound, water or oxygen from the filtered gas. The purified filtered gas may then be recirculated and provided to the storage chamber as the purge gas.

20 Claims, 6 Drawing Sheets

RECIRCULATION HIGH PURITY SYSTEM FOR PROTECTING OPTICAL MODULES OR INSPECTION SYSTEM DURING STORAGE, TRANSPORT AND SHIPPING

TECHNICAL FIELD

The disclosure generally relates to the field of packaging, particularly to protecting electrical and/or optical modules during storage, transport and shipping.

BACKGROUND

Cleanliness may be a critical requirement for various devices. For example, optical components (e.g., mirrors, windows, sensors/detectors or the like), inspection systems/modules, electrical devices as well as various other products may have to satisfy certain cleanliness requirements, or otherwise they may be deemed defective.

Special attention must be paid when such a device is packaged for storage and/or transportation to prevent or reduce contamination. The sources of contamination may be from the device itself or from the surrounding environment such as the packaging systems, cargo bays, loading and unloading docks, or the warehouse where the device may be stored. Therefore, the device may be placed inside a clean, sealed storage chamber/container during storage or transportation to prevent deposition of contaminants.

However, the seals may not hold well in pressure changes such as when the package is transported via air. In such cases, contaminants that exist in the cargo bay may be introduced into the storage chamber. In addition, the storage chamber and seals themselves may produce contaminants that may damage the device stored within.

While some contaminants may be removed from the device by subsequent flushing with high purity inert gasses or with ionized inert gasses, this process may not be able to remove many contaminants that are transported via gas phase to the surfaces of the device. Special attention must be paid to these contaminants that are not removable at a later time. Therein lies a need for a system and method for protecting such devices during storage, transport and shipping.

SUMMARY

The present disclosure is directed to a purging apparatus for a storage chamber. The purging apparatus is configured for establishing a purge gas flow through the storage chamber. The purging apparatus may include a gas purifier and a particle filter. The gas purifier may provide a purge gas to the storage chamber. The purge gas may flow through the storage chamber, and a mixture of the purge gas and potential contaminants may subsequently exit the storage chamber as exhaust gas. The particle filter may receive and filter the exhaust gas. The filtered gas may be provided to the gas purifier for purification and recirculation. The gas purifier may purify the filtered gas by substantially removing at least one of: an acid, a base, an organic compound, water or oxygen from the filtered gas. The purified filtered gas may then be recirculated and provided to the storage chamber as the purge gas. A continuous flow of purified purge gas may be provided in order to satisfy the cleanliness requirements of the components stored within the storage chamber.

A further embodiment of the present disclosure is directed to a storage system. The storage system may include a storage chamber having a gas inlet and a gas outlet. The storage system may also include a gas purifier configured for providing a purge gas to the storage chamber through the gas inlet. The storage system may further include a particle filter configured for receiving an exhaust gas from the storage chamber through the gas outlet, filtering the exhaust gas, and providing the filtered gas to the gas purifier. The gas purifier may be further configured for purifying the filtered gas by substantially removing at least one of: an acid, a base, an organic compound, water or oxygen from the filtered gas. The purified filtered gas may then be recirculated as the purge gas and provided to the storage chamber through the gas inlet.

An additional embodiment of the present disclosure is directed to a method for providing active purging for a storage chamber. The method may include providing a purge gas to the storage chamber; receiving an exhaust gas from the storage chamber, the exhaust gas including a mixture of the purge gas and potential contaminants; filtering the exhaust gas by providing retention of particles greater than or equal to approximately 3 nm in size; purifying the filtered exhaust gas by substantially removing at least one of: an acid, a base, an organic compound, water or oxygen from the filtered exhaust gas; and recirculating the purified filtered exhaust gas as the purge gas and providing the purge gas to the storage chamber. The method may further include steps to prevent water or molecular condensation in the storage chamber.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Figure 1:
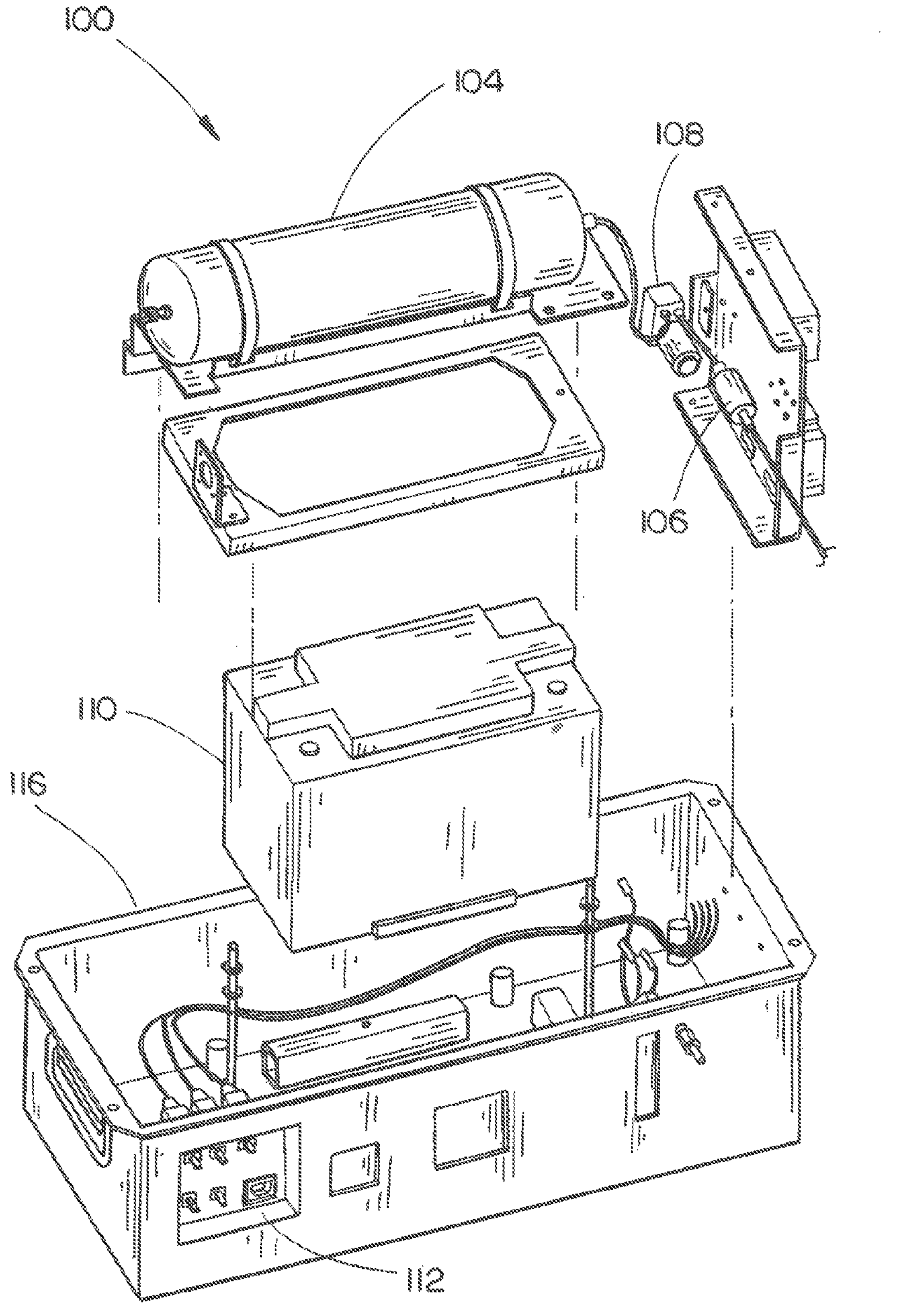
FIG. 1 is an exploded view of a purging apparatus in accordance with the present disclosure.
Figure 2:
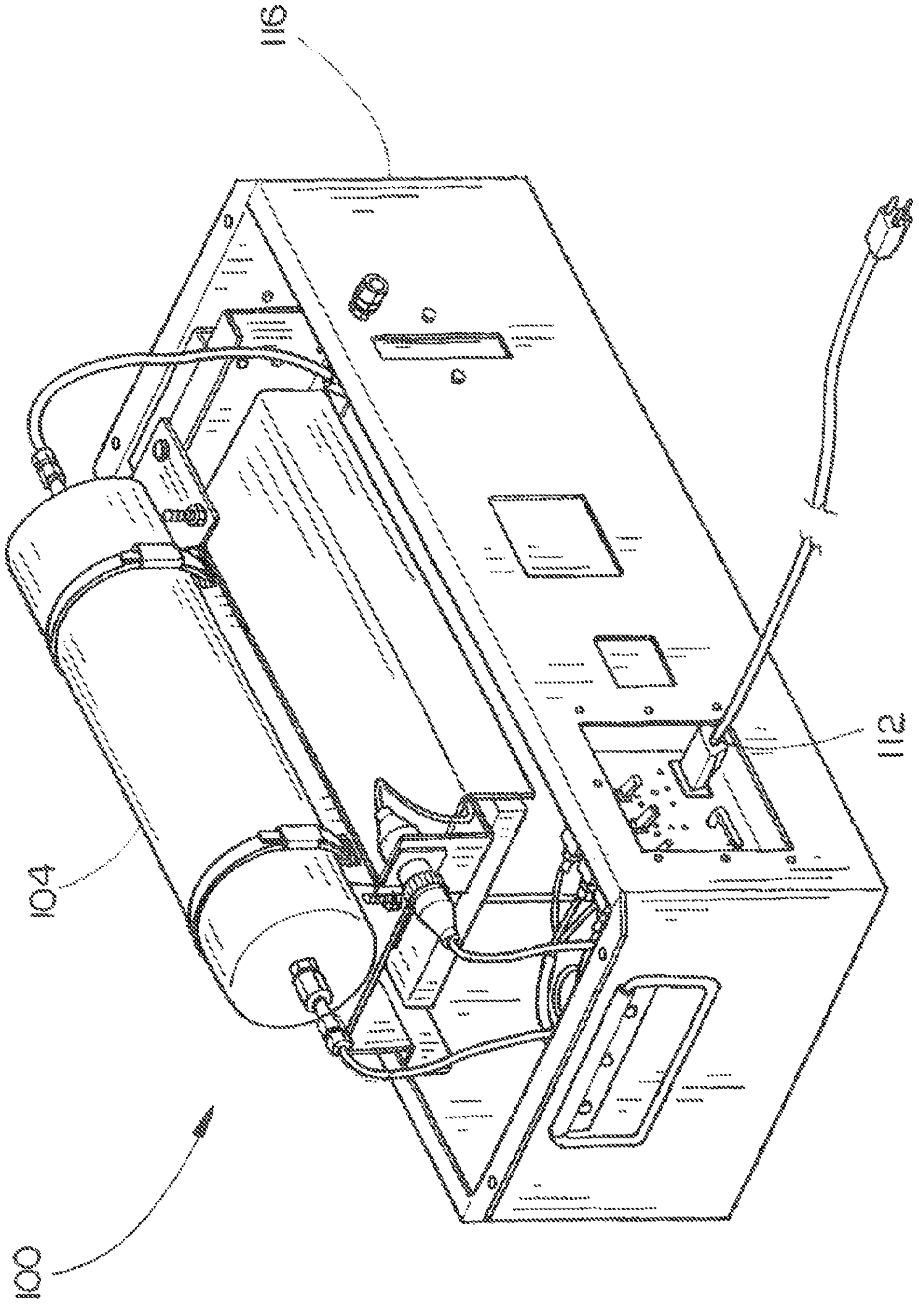
FIG. 2 is an isometric view of the purging apparatus without a top cover.
Figure 3:
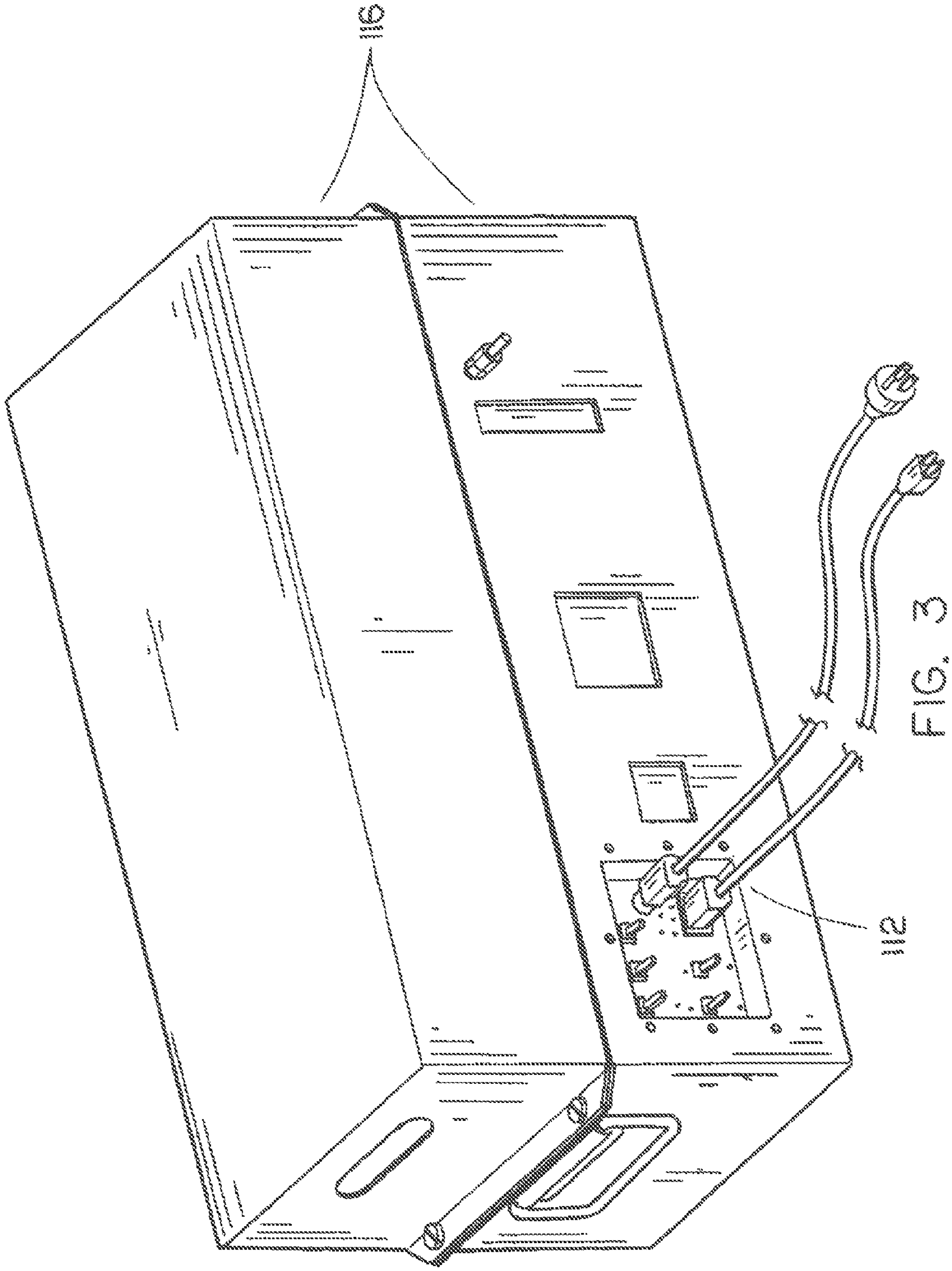
FIG. 3 is an isometric view of the purging apparatus with the top cover.
Figure 4:
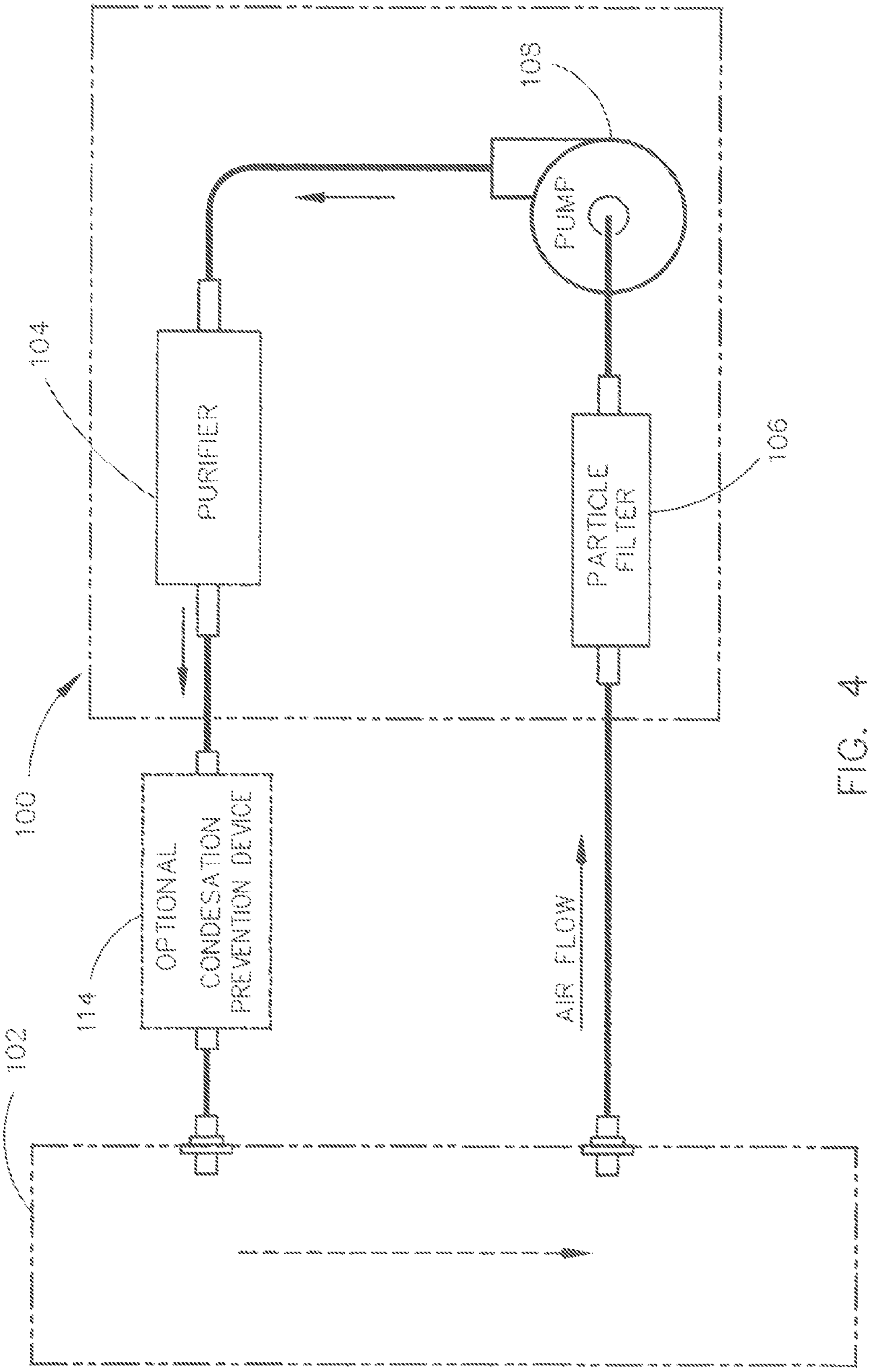
FIG. 4 is an illustration depicting the air flow.

Reference will now be made in detail to the subject matter disclosed, which is illustrated in the accompanying drawings.

The present disclosure is directed to an apparatus for providing a high purity purge gas flow through a storage chamber. The high purity purge gas flowing through the storage chamber keeps the components (e.g., electrical or optical modules and the like) stored within the chamber clean and prevents deposition of contaminants on the surfaces of the components as well as chamber walls. A mixture of the purge gas and potential contaminants subsequently exits the storage chamber, and is filtered, re-purified, and recirculated through the storage chamber in accordance with the present disclosure. In this manner, a continuous flow of purified purge gas may be provided in order to satisfy the cleanliness requirements of the components stored within the chamber.

Referring generally to FIGS. 1 through 4, an apparatus 100 for providing a high purity purge gas flow through a storage chamber 102 is shown. The storage chamber 102 may refer to any device (e.g., a container, a bag, a box, or the like) that may be utilized to store or transport one or more components.

The apparatus 100 may include a gas purifier 104 configured for purifying the purge gas and providing the high purity purge gas to the storage chamber 102. In one embodiment, the purge gas utilized may include inert gasses such as nitrogen, xenon, argon, helium, a combination of such inert gasses or the like. Furthermore, clean dry air (CDA) may also be utilized as the purge gas. The gas purifier 104 is configured to remove contaminants from the purge gas before the purge gas enters the storage chamber 102. For example, the contaminants to be removed may include, but not limited to, acids, bases, siloxanes, plasticizers (e.g., phthalates), benzenes, organic compounds, hydrocarbons, water, oxygen or the like. In addition, various long-chained molecules (e.g., with boiling point >120° C., molecular mass >120 g/mol, especially those which contain carbonyl groups and/or refractory compounds) may also need to be removed from the purge gas, as well as certain refractory materials, compounds, or atoms forming nonvolatile or reactive oxides, such as phosphorus, silicon, sulfur, tin, aluminum or the like.

It is contemplated that the gas purifier 104 may be implemented as a single device capable of providing the required purification. Alternatively, the gas purifier 104 may include multiple stages configured for various types of purifications. It is also contemplated that more than one gas purifier 104 may be utilized without departing from the spirit and scope of the present disclosure.

Once introduced to the storage chamber 102, the high purity purge gas flows through the storage chamber 102 and keeps the components (e.g., electrical or optical modules and the like) stored within the chamber and the chamber walls clean. A mixture of the purge gas and potential contaminants may then exit the storage chamber 102 as exhaust gas. The exhaust gas may be filtered, purified, and recirculated in order to provide a continuous flow of the purge gas through the storage chamber 102.

For instance, the apparatus 100 may include a particle filter 106 configured for receiving the exhaust gas from the storage chamber 102. The particle filter 106 may filter the exhaust gas from the storage chamber 102 before the exhaust gas enters the gas purifier 104 for recirculation. In one embodiment, the particle filter is configured to provide retention of particles greater than or equal to approximately 3 nm in size (i.e., providing particle control to 3 nm). However, it is contemplated that particle control of various other sizes may be utilized without departing from the spirit and scope of the present disclosure.

Subsequently, the filtered gas may be provided as input to the gas purifier 104. The gas purifier 104 may remove the contaminants (e.g., acids, bases, organics, water, oxygen and the like) from the filtered gas as described above and produce the high purity purge gas as output. The high purity purge gas may then be introduced to the storage chamber 102 again, forming a recirculation of the purge gas in a closed loop. It is contemplated that the closed loop formed in this manner may purify the purge gas to purity levels of sub parts-per-million.

It is contemplated that one or more gas pumps/motors 108 may be utilized to facilitate the gas flow between the gas purifier 104, the storage chamber 102, the particle filter 106, and return back to the gas purifier 104. In one embodiment, one or more gas pumps/motors 108 may be positioned between the particle filter 106 and the gas purifier 104, where the gas pump(s) 108 may receive the filtered gas from the particle filter 106 and provide the filtered gas as input to the gas purifier 104. Various types of pipes/tubes may be utilized to fluidly connect the gas purifier 104, the storage chamber 102 and the particle filter 106. For instance, polytetrafluoroethylene (PTFE) tubes may be utilized for their corrosion resistance, high purity, and low frictional properties.

It is also contemplated that the apparatus 100 may include a power supply for powering the gas pump(s) 108. The power supply may include, for example, an internally-supplied power source 110 and/or an external power connection 112. The internally-supplied power source 110 may be a battery, a power generator for continuous power supply or the like. In this manner, the apparatus 100 may be powered by the internally-supplied power 110 for several hours or days, or it may be powered by electricity supplied from an external source for an extended period of time. The apparatus 100 may therefore be suitable for providing active purging for the storage chamber 102 during transportation, short-term or long-term storage.

Figure 5:
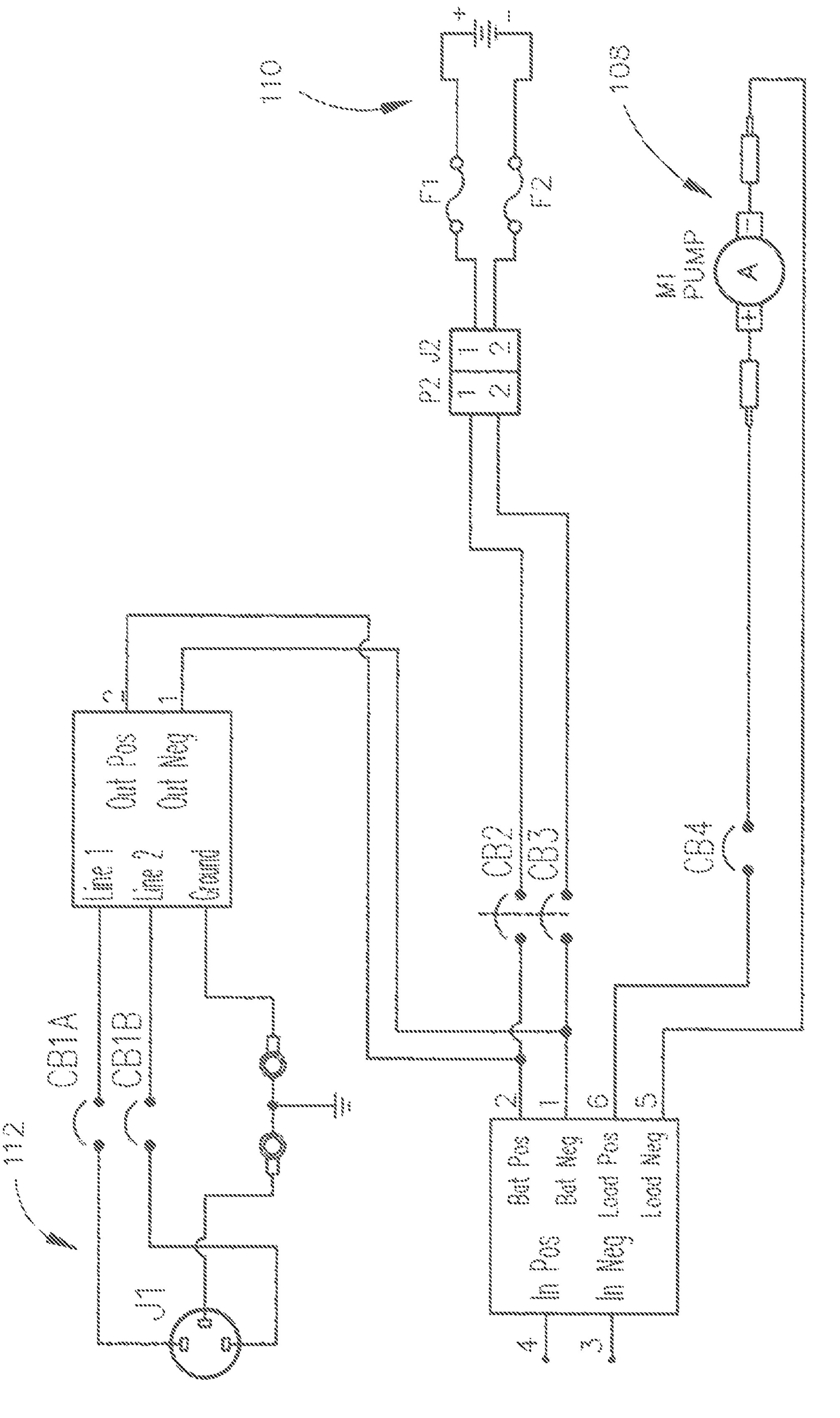
FIG. 5 is a schematic diagram depicting an exemplary electrical connection for the purging apparatus.

FIG. 5 is a schematic diagram illustrating an exemplary electrical connection between the gas pump(s) 108, the internally-supplied power source 110 (e.g., battery) and/or an external power connection 112 (e.g., for engaging with an AC power source). It is understood that the electrical connection may be provided in various other configurations without departing from the spirit and scope of the present disclosure.

It is further contemplated that a condensation prevention device 114 may be utilized together with the apparatus 100 to help reducing/preventing water or molecular condensation in the storage chamber 102. For instance, the condensation prevention device 114 may include one or more heaters for heating the components and critical surfaces inside the storage chamber 102 to prevent water or molecular condensation. Optional dryer(s) and/or heater(s) may also be utilized for drying and/or heating the purge gas provided by the gas purifier 104 prior to entering storage chamber 102.

The purging apparatus in accordance with the present disclosure may be implemented as a stand-alone device for providing active purging for any storage chamber capable of receiving the purge gas through a gas inlet and discharge the exhaust gas through a gas outlet. In such implementations, the purging apparatus may be enclosed in a portable housing 116 for protection and ease of transportation. Alternatively, the purging apparatus in accordance with the present disclosure may also be implemented as an integrated component of a storage system. In such implementations, the various components of the purging apparatus (e.g., the gas purifier, the particle filter, the gas pumps) may be physically located apart from each other as long as they are fluidly connected to form the closed loop purge gas recirculation.

Utilizing active purging in accordance with the present disclosure increases the cleanliness of the storage chamber and helps reducing the number of defective items damaged due to contaminations. Setup time during installation may also be reduced because the delivered items (e.g., optical components) do not require extended purging and/or drying upon arrival. Furthermore, the delivered items do not need to be assembled immediately upon arrival (which is the case with conventional package in order to minimize possible contaminations), as active purging may be continuously provided for short-term or even long-term storage, therefore providing increased installation schedule flexibility.

Figure 6:
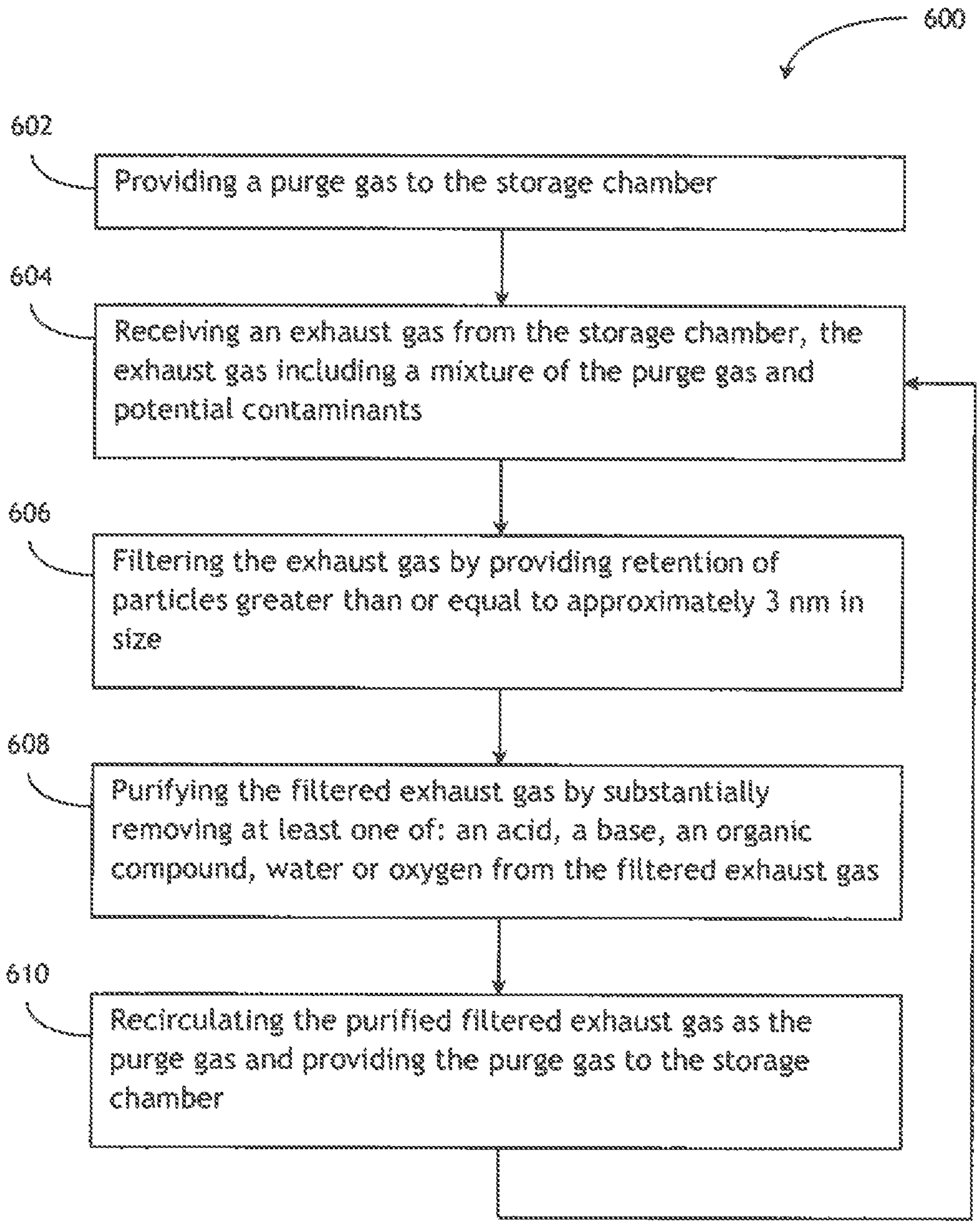
FIG. 6 is a flow diagram illustrating a method for providing active purging for a storage chamber.

Referring to FIG. 6, a method 600 for providing active purging for a storage chamber is shown. A high purity purge gas is provided to the storage chamber in step 602 and a mixture of the purge gas and potential contaminants may exit the storage chamber as exhaust gas. Step 604 may receive the exhaust gas from the storage chamber, and step 606 may filter the exhaust gas by providing retention of particles greater than or equal to approximately 3 nm in size. The filtered gas may be purified in step 608, which substantially removes acids, bases, organic compounds, water and oxygen from the filtered gas in order to provide the purge gas with purity levels of sub parts-per-million. Step 610 may then recirculate the purified purge gas and provide it to the storage chamber, and the method may repeat from step 604 again in a continuous manner.

The methods disclosed may be implemented as sets of instructions, through a single production device, and/or through multiple production devices. Further, it is understood that the specific order or hierarchy of steps in the methods disclosed are examples of exemplary approaches. Based upon design preferences, it is understood that the specific order or hierarchy of steps in the method can be rearranged while remaining within the scope and spirit of the disclosure. The accompanying method claims present elements of the various steps in a sample order, and are not necessarily meant to be limited to the specific order or hierarchy presented.

It is believed that the system and method of the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory.

What is claimed is:

1. A purging apparatus for a cargo storage chamber, the purging apparatus configured for establishing a purge gas flow through the cargo storage chamber, the purging apparatus comprising:

a gas purifier configured for providing a purge gas to the cargo storage chamber;

a particle filter configured for receiving an exhaust gas from the cargo storage chamber, the exhaust gas including a mixture of the purge gas and potential contaminants, the particle filter further configured for filtering the exhaust gas and providing a filtered gas to the gas purifier; and the gas purifier further configured for purifying the filtered gas by substantially removing at least one of: an acid, a base, an organic compound, water or oxygen from the filtered gas, the purified filtered gas being recirculated and provided to the cargo storage chamber as the purge gas.

2. The purging apparatus of claim 1, wherein the purge gas includes an inert gas.

3. The purging apparatus of claim 1, wherein the particle filter provides retention of particles greater than or equal to approximately 3 nm in size.

4. The purging apparatus of claim 1, further comprising:

at least one gas pump configured for facilitating gas flow between the particle filter, the gas purifier and the cargo storage chamber.

5. The purging apparatus of claim 4, wherein the at least one gas pump is positioned between the particle filter and the gas purifier.

6. The purging apparatus of claim 4, further comprising:

a power supply for powering the at least one gas pump, the power supply including at least one of: a battery, a continuous power supply or an external power connection.

7. The purging apparatus of claim 6, wherein the particle filter, the gas purifier, the at least one gas pump and the power supply are enclosed in a portable housing.

8. The purging apparatus of claim 1, further comprising:

a device configured for preventing condensation in the cargo storage chamber.

9. The purging apparatus of claim 8, wherein the device includes at least one of: a dryer, a dehumidifier or a heater.

10. A storage system, comprising:

a cargo storage chamber having a gas inlet and a gas outlet;

a gas purifier configured for providing a purge gas to the cargo storage chamber through the gas inlet;

a particle filter configured for receiving an exhaust gas from the cargo storage chamber through the gas outlet, the exhaust gas including a mixture of the purge gas and potential contaminants, the particle filter further configured for filtering the exhaust gas and providing a filtered gas to the gas purifier; and the gas purifier further configured for purifying the filtered gas by substantially removing at least one of: an acid, a base, an organic compound, water or oxygen from the filtered gas, the purified filtered gas being recirculated as the purge gas and provided to the cargo storage chamber through the gas inlet.

11. The storage system of claim 10, wherein the purge gas includes an inert gas.

12. The storage system of claim 10, wherein the particle filter provides retention of particles greater than or equal to approximately 3 nm in size.

13. The storage system of claim 10, further comprising:

at least one gas pump configured for facilitating gas flow between the particle filter, the gas purifier and the cargo storage chamber.

14. The storage system of claim 13, further comprising:

a power supply for powering the at least one gas pump, the power supply including at least one of: a battery, a continuous power supply or an external power connection.

15. The storage system of claim 10, wherein the storage system is configured to be portable.

16. The storage system of claim 10, further comprising:

a device configured for preventing condensation in the cargo storage chamber.

17. The storage system of claim 16, wherein the device includes at least one of: a dryer, a dehumidifier or a heater.

18. A method for providing active purging for a cargo storage chamber, the method comprising:

providing a purge gas to the cargo storage chamber;

receiving an exhaust gas from the cargo storage chamber, the exhaust gas including a mixture of the purge gas and potential contaminants;

filtering the exhaust gas by providing retention of particles greater than or equal to approximately 3 nm in size;

purifying the filtered exhaust gas by substantially removing at least one of: an acid, a base, an organic compound, water or oxygen from the filtered exhaust gas; and recirculating the purified filtered exhaust gas as the purge gas and providing the purge gas to the cargo storage chamber.

19. The method of claim 18, wherein the purge gas includes an inert gas.

20. The method of claim 18, further comprising:

preventing water or molecular condensation in the cargo storage chamber.

* * * * *